US008812632B2

(12) United States Patent
Buendgen

(10) Patent No.: US 8,812,632 B2
(45) Date of Patent: *Aug. 19, 2014

(54) ARRANGEMENT FOR OPERATING A COMPUTER CLUSTER

(71) Applicant: International Business Machines Corporation, Armonk, NY (US)

(72) Inventor: Reinhard Buendgen, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/779,495

(22) Filed: Feb. 27, 2013

(65) Prior Publication Data

US 2013/0173763 A1 Jul. 4, 2013

Related U.S. Application Data

(63) Continuation of application No. 13/449,968, filed on Apr. 18, 2012.

(30) Foreign Application Priority Data

May 11, 2011 (EP) .................................. EP11165643

(51) Int. Cl.
*G06F 15/177* (2006.01)
(52) U.S. Cl.
USPC ............................. 709/220; 370/218; 370/354
(58) Field of Classification Search
CPC ..... H04L 41/08; H04L 12/24; H04L 43/0811; G06F 9/06; G06F 9/46
USPC .................. 709/220; 370/218–354
See application file for complete search history.

(56) References Cited

U.S. PATENT DOCUMENTS

| 6,738,350 | B1 * | 5/2004 | Gao et al. ...................... 370/232 |
| 6,782,416 | B2 | 8/2004 | Cochran et al. |
| 7,016,946 | B2 | 3/2006 | Shirriff |
| 7,103,664 | B1 * | 9/2006 | Novaes et al. ................ 709/226 |
| 7,653,716 | B2 * | 1/2010 | Faraj .............................. 709/223 |
| 8,018,863 | B2 * | 9/2011 | Kini et al. ...................... 370/248 |
| 8,550,917 | B2 * | 10/2013 | Chiao et al. ..................... 463/40 |
| 2003/0023680 | A1 | 1/2003 | Shirriff |
| 2003/0097429 | A1 * | 5/2003 | Wu et al. ........................ 709/220 |
| 2003/0182264 | A1 * | 9/2003 | Wilding et al. ................... 707/1 |

(Continued)

OTHER PUBLICATIONS

U.S. Appl. No. 13/449,968, Office Action, Dec. 18, 2013.

*Primary Examiner* — Wing F Chan
*Assistant Examiner* — Razu Miah
(74) *Attorney, Agent, or Firm* — Kunzler Law Group

(57) ABSTRACT

An arrangement is disclosed for operating a computer cluster distributed over multiple locations using quorum mechanism. The cluster includes interconnected defined system instances. The arrangement includes distributing the cluster configuration to each system instance, and constantly checking system instance connectivity to determine reachable system instances. Each healthy system instance determines a subcluster of itself and all reachable system instances. Information of the distributed cluster configuration is used to calculate a corresponding subcluster configuration. Subcluster configuration information and the cluster configuration information is used for computing a new quorum decision for the corresponding subcluster, using a location quorum function considering proportions of connected locations containing reachable system instances, and weights of the reachable system instances in the locations. Workload placement decisions are made based on the new quorum granting permission to place workload to system instances in a specific subcluster, or refusing the permission, whenever the subcluster changes.

9 Claims, 5 Drawing Sheets

(56) References Cited

U.S. PATENT DOCUMENTS

| | | |
|---|---|---|
| 2004/0205148 A1 | 10/2004 | Bae et al. |
| 2005/0015471 A1* | 1/2005 | Zhang et al. .................. 709/221 |
| 2005/0262382 A1 | 11/2005 | Bain |
| 2006/0165040 A1* | 7/2006 | Rathod et al. ................. 370/335 |
| 2010/0125477 A1 | 5/2010 | Mousseau et al. |
| 2010/0306249 A1* | 12/2010 | Hill et al. ...................... 707/769 |

* cited by examiner

ARRANGEMENT FOR OPERATING A COMPUTER CLUSTER

CROSS-REFERENCE TO RELATED APPLICATIONS

This application is a continuation of U.S. patent application Ser. No. 13/449,968 entitled "METHOD AND ARRANGEMENT FOR OPERATING A COMPUTER CLUSTER" filed on Apr. 18, 2012 for Reinhard Buendgen, which claims priority to European Patent Application No. EP11165643 filed on May 11, 2011 for International Business Machines, the entire contents of the above mentioned applications are incorporated herein by reference for all purposes.

FIELD

The present invention relates in general to the field of computer clusters, and in particular to a method for operating a computer cluster, and an arrangement for operating a computer cluster. Still more particularly, the present invention relates to a data processing program and a computer program product for operating a computer cluster.

BACKGROUND

Description of the Related Art

Computer clusters comprise a set of operating system instances running on a set of physical or virtual hardware instances that are connected via a network. Each such instance is called a node of the cluster. Each node of the cluster may be either healthy (life/up/running) or down. A cluster is typically used to run some workload in a manner that is coordinated among the nodes of the cluster. The computer clusters are also used to run workloads independent of a specific computer hardware or operating system instance, and to place a workload on any of the nodes within a cluster according to the availability of those nodes. In order to keep a workload available in a cluster the cluster must provide enough redundancy to avoid single points of failures.

In addition cluster management software is in charge to place workloads on specific nodes. The cluster management in charge of workload placement decisions may not place certain workloads on two or more nodes at a time. Often the nodes of a cluster are distributed among multiple locations or sites where a location may be a geographical location, like a room, a building, a town, etc. or a hardware that hosts multiple nodes, e.g. a hypervisor aka virtual machine monitor. If such a location fails all the nodes it contains fail, too. To deal with failures of nodes or the connectivity among nodes the cluster management software is typically distributed among the nodes of the cluster. It comprises membership services that on each node compute which other nodes are life and reachable. A set of life nodes that are mutually reachable is called a subcluster. Certain critical workloads may not be run in two separate subclusters at a time. Hence only one subcluster at a time may be granted quorum to run such a critical workload.

A basic requirement for computer cluster is that no node accesses and/or manipulates a critical resource without other life nodes being aware of this access and/or manipulation. At any time only nodes having a working connectivity to the node that accesses and/or manipulates the critical resource may be aware of this access and/or manipulation. Working connectivity is considered a transitive relation, i.e. if node "a" has connectivity to node "b" and node "b" has connectivity to node "c" then node "a" has also connectivity to node "c".

A quorum is a mechanism to decide which node in a computer cluster may access critical resources. Nodes that "have quorum" may access critical resources. Nodes that do "not have quorum" may not access critical resources they may even be forced down or "commit suicide".

State of the art membership services use a majority based quorum function to compute in each subcluster whether the quorum may be granted to it by granting quorum only to a largest connected subcluster of healthy nodes that contains more than 50% of the nodes defined in the cluster. In case of a tie, which means a subcluster with exactly 50% of the defined nodes, the quorum may be granted to the one subcluster that successfully competes for a tiebreaker. Typical state of the art tiebreakers are lock devices (e.g. disk reserves) or operators who interactively grant the tiebreaker to the appropriate subcluster. A subcluster that contains less the 50% of the defined nodes is denied quorum and may not run a critical workload. Hence in a cluster that uses a majority based quorum function where the nodes are distributed over multiple locations, a location that contains more than 50% of the nodes is a single point of failure.

In the patent Publication U.S. Pat. No. 7,016,946 B2 "METHOD AND SYSTEM FOR ESTABLISHING A QUORUM FOR A GEOGRAPHICALLY DISTRIBUTED CLUSTER OF COMPUTERS" by Shirriff a method that facilitates establishing a quorum for a cluster within a plurality of computers that are geographically distributed is disclosed. The disclosed method comprises detecting a change in membership of the cluster at a computer within the plurality of computers; and upon detecting the change in membership, forming a potential new cluster by attempting to communicate with all other computers within the plurality of computers, accumulating votes for each computer successfully contacted, attempting to gain control of a quorum server located at a site that is geographically separate from all computers within the plurality of computers, if successful, accumulating the quorum server's votes, and if a total of accumulated votes includes a majority of available votes, forming a new cluster from the potential new cluster.

If the nodes of a cluster are distributed across multiple sites (e.g. locations, hypervisors), a site or the connectivity to a site constitutes a single point of failure (SPOF) for all nodes located in that site.

Therefore a standard majority based quorum may lead to unexpected results where no node is granted quorum if the nodes are asymmetrically distributed among the sites. In particular in a cluster distributed over two sites the site that hosts a majority of the nodes is a single point of failure (SPOF) for the whole cluster.

BRIEF SUMMARY

The technical problem underlying the present invention is to provide a method for operating a computer cluster and an arrangement for operating a computer cluster, which are able to define a quorum function that can be evaluated locally on every node and may be configured such that the failure of half of the sites of a configured cluster does not necessarily result in no nodes being granted the quorum and to solve the above mentioned shortcomings and pain points of prior art methods and arrangements for operating a computer cluster distributed over multiple locations.

A method is provided for operating a computer cluster distributed over multiple locations using quorum mechanism, where said cluster (C) comprises a plurality of interconnected defined system instances running on one or a physical and a virtual hardware, and wherein a cluster configuration (CC) comprises location information about each system instance defined in said cluster (C). The method in some embodiments, includes distributing said cluster configuration (CC) to each defined system instance and constantly checking connectivity among said system instances defined in said cluster (C) to determine reachable system instances, where each healthy system instance determines a subcluster (SCx) comprising itself and all reachable system instances said healthy system instance is connected to, using information of said distributed cluster configuration (CC).

The method, in some embodiments, includes calculating a corresponding subcluster configuration (SCC(SCx)) comprising location information about each system instance of said subcluster (SCx) and using said subcluster configuration (SCC(SCx)) information and said cluster configuration (CC) information for computing a new quorum decision for said corresponding subcluster (SCx) said healthy system instance is member of, using a location quorum function (LQF) considering proportions of connected locations containing reachable system instances, and weights of said reachable system instances in said locations, wherein workload placement decisions are made based on said computed new quorum granting permission to place workload to system instances in a specific subcluster (SCx), or refusing said permission, whenever said subcluster (SCx) changes.

In one embodiment, the method steps listed above are included in a computer program product that includes computer readable storage medium having computer readable program code. The computer readable program code is configured to execute the steps of the method.

An apparatus is included for operating a computer cluster distributed over multiple locations using quorum mechanism, where said cluster (C) comprises a plurality of interconnected defined system instances running on a physical or virtual hardware, wherein each system instance in said cluster (C) runs a distributed cluster manager (P), wherein a cluster configuration (CC) comprises location information about each system instance defined in said cluster (C) and is distributed to each defined system instance. The apparatus, in one embodiment, includes a membership service (M) that constantly checks connectivity among said system instances defined in said cluster (C) to determine reachable system instances, wherein said membership service (M) in each healthy system instance determines a subcluster (SCx) comprising said corresponding healthy system instance and all reachable system instances said healthy system instance is connected to, using information of said distributed cluster configuration (CC), and that calculates corresponding subcluster configuration (SCC(SCx)) comprising location information about each system instance of said subcluster (SCx).

In other embodiments, the apparatus includes a location aware quorum computation service (Q) in said healthy system instance that uses said subcluster configuration (SCC(SCx)) information and said cluster configuration (CC) information for computing a new quorum decision for said corresponding subcluster (SCx) said healthy system instance is member of, using a location quorum function (LQF) considering proportions of connected locations containing reachable system instances, and weights of said reachable system instances in said locations. The apparatus may include a workload placement software service (P) in said healthy system instance that makes workload placement decisions based on said computed new quorum granting permission to place workload to system instances in a specific subcluster (SCx), or refusing said permission, whenever said subcluster (SCx) changes. Advantageous embodiments of the present invention are mentioned in the sub claims.

Accordingly, in an embodiment of the present invention a method for operating a computer cluster distributed over multiple locations using quorum mechanism, wherein the cluster comprises a plurality of interconnected defined system instances running on a physical or virtual hardware, and wherein a cluster configuration comprises location information about each system instance defined in the cluster, comprises distributing the cluster configuration to each defined system instance, and constantly checking connectivity among the system instances defined in the cluster to determine reachable system instances, wherein each healthy system instance determines a subcluster comprising itself and all reachable system instances the healthy system instance is connected to, using information of the distributed cluster configuration; calculates a corresponding subcluster configuration comprising location information about each system instance of the subcluster; and uses the subcluster configuration information and the cluster configuration information for computing a new quorum decision for the corresponding subcluster the healthy system instance is member of, using a location quorum function considering proportions of connected locations containing reachable system instances, and weights of the reachable system instances in the locations, and wherein workload placement decisions are made based on the computed new quorum granting permission to place workload to system instances in a specific subcluster, or refusing the permission, whenever said subcluster changes.

In further embodiments of the present invention, a majority based quorum function considering a total number of connected healthy system instances and a total number of defined system instances in the cluster is used in combination to the location quorum function to calculate the new quorum for the corresponding subcluster In further embodiments of the present invention, the location quorum function is used to solve a tie situation of the majority based quorum function, and a tiebreaker function is used to solve a tie situation of the location quorum function.

In further embodiments of the present invention, at least one of the location quorum function and the majority based quorum function comprise a configurable range of quorum tie situations.

In further embodiments of the present invention, the distributed cluster configuration comprises at least one of the following the total number of defined system instances in the cluster, the total number of locations in the cluster, the total number of defined system instances in a corresponding location, identification information of each system instance, first tie range information of the majority based quorum function, second tie range information of the location quorum function, and at least one tie time out value, wherein a first tie range of the majority based quorum function is defined by the first tie range information which is configurable as $(0 \leq rm \leq 0.5)$ such that the first tie range extends from $(0.5-rm)$ to $(0.5+rm)$, and wherein a second tie range of the location quorum function is defined by the second tie range information which is configurable as $(0 \leq rl \leq 0.5)$ such that said second tie range extends from $(0.5-rl)$ to $(0.5+rl)$.

In further embodiments of the present invention, the location quorum function calculates for each location of the at least one subcluster a first location ratio based on the total number of healthy system instances in the corresponding subcluster, and the total number of defined system instances in the corresponding location.

In further embodiments of the present invention, the location quorum function calculates a sum of all first location ratios of the at least one subcluster, wherein the location quorum function grants quorum to a corresponding subcluster if a ratio based on the calculated sum and the total number of locations defined in the cluster is larger than a configurable first threshold, and denies quorum, if the ratio based on the calculated sum and the total number of locations defined in the cluster is smaller than a configurable second threshold, else the location quorum function solves an occurring tie situation using the tiebreaker function, wherein the location quorum function denies quorum, if the tie situation is not solved within a configurable timeout period.

In further embodiments of the present invention, the location quorum function calculates for each location of the at least one subcluster a second location ratio based on the first location ratio, wherein the second location ratio outputs a value of "1", if a value of the first location ratio is larger than a value of (0.5), or if the first location ration is equal to the value of (0.5) and a corresponding subcluster has won a tiebreaker specific to the location, else the second location ratio outputs a value of "0", wherein the location quorum function calculates a sum of all second location ratios of the at least one subcluster, wherein the location quorum function grants quorum to a corresponding subcluster if a ratio based on the calculated sum and the total number of locations defined in the cluster is larger than the configurable first threshold, and denies quorum, if the ratio based on the calculated sum and the total number of locations defined in the cluster is smaller than the configurable second threshold, else the location quorum function solves an occurring tie situation using the tiebreaker function, wherein the location quorum function denies quorum, if the tie situation is not solved within a configurable timeout period.

In further embodiments of the present invention, the majority based quorum function calculates for each subcluster a subcluster ratio based on the total number of healthy system instances in a corresponding subcluster and the total number of defined system instances in the cluster, wherein the majority based quorum function grants quorum to a corresponding subcluster if the subcluster ratio is larger than a configurable third threshold, and denies quorum, if the subcluster ratio is smaller than a configurable fourth threshold, else the majority based quorum function solves an occurring tie situation using the location quorum function, wherein the majority based quorum function denies quorum, if the tie situation is not solved within a configurable timeout period.

In another embodiment of the present invention, an arrangement for operating a computer cluster distributed over multiple locations using quorum mechanism is claimed, wherein the cluster comprises a plurality of interconnected defined system instances running on a physical or virtual hardware, wherein each system instance in the cluster runs a distributed cluster manager, wherein a cluster configuration comprises location information about each system instance defined in the cluster and is distributed to each defined system instance, wherein a membership service constantly checks connectivity among the system instances defined in the cluster to determine reachable system instances, wherein the membership service in each healthy system instance determines a subcluster comprising the corresponding healthy system instance and all reachable system instances the healthy system instance is connected to, using information of the distributed cluster configuration; and calculates corresponding subcluster configuration comprising location information about each system instance of the subcluster; wherein a location aware quorum computation service in the healthy system instance uses the subcluster configuration information and the cluster configuration information for computing a new quorum decision for the corresponding subcluster the healthy system instance is member of, using a location quorum function considering proportions of connected locations containing reachable system instances, and weights of the reachable system instances in the locations, and wherein a workload placement software service in the healthy system instance makes workload placement decisions based on the computed new quorum granting permission to place workload to system instances in a specific subcluster, or refusing the permission, whenever the subcluster changes.

In further embodiments of the present invention, the location aware quorum computation service uses a majority based quorum function considering a total number of connected healthy system instances and a total number of defined system instances in the cluster in combination to the location quorum function to calculate the new quorum for the corresponding subcluster.

In further embodiments of the present invention, the location aware quorum computation service uses the location quorum function to solve a tie situation of the majority based quorum function, and a tiebreaker function to solve a tie situation of the location quorum function, wherein at least one of the location quorum function and the majority based quorum function comprise a configurable range of quorum tie situations.

In further embodiments of the present invention, the distributed cluster configuration comprises at least one of the following a total number of defined system instances in the cluster, a total number of locations in the cluster, a total number of defined system instances in a corresponding location, identification information of each system instance, a first tie range information of the majority based quorum function, a second tie range information of the location quorum function, and at least one tie time out value.

In another embodiment of the present invention, a data processing program for execution in a data processing system comprises software code portions for performing a method for operating a computer cluster when the program is run on the data processing system.

In yet another embodiment of the present invention, a computer program product stored on a computer-usable medium, comprises computer-readable program means for causing a computer to perform a method for operating a computer cluster when the program is run on the computer.

All in all, embodiments of the present invention define a quorum function that can be evaluated locally on every system instance or node and may be configured such that the failure of half of the locations or sites of a configured cluster does not necessarily result in no nodes being granted the quorum. In addition the quorum function also works for nodes failures or connection losses that do not coincide with site failures. Therefore embodiments of the present invention provide high availability in a computer cluster which is distributed over multiple locations by using quorum mechanism.

The core idea of the present invention is to use a quorum mechanism to draw workload placement decisions triggered by arbitrary node or connection failures such that the failure or isolation of a location containing more than half of the defined nodes will not necessarily disable the cluster from running workloads. At the same time this invention will avoid to place workloads to subclusters that are smaller than a minimal threshold configured by an operator. In the cluster critical resources are protected by a quorum, so that only nodes that "have quorum" are allowed to access the critical resource. Full cluster connectivity is not a prerequisite for local quorum computations.

Embodiments of the present invention consider the total number of healthy connected nodes, and the total number of healthy connected sites, deal with failures of individual nodes and avoid anomalies.

Embodiments of the present invention employ a location quorum function based on the proportions of locations that contain healthy nodes of a subcluster. The node weights are used to deal with location of which some nodes belong to one subcluster and other nodes have failed or belong to other subclusters. This base concept may be improved by a configurable tie range which allows configuring the quorum mechanism according to customer preferences. Additional the local quorum function may be used as tiebreaker for a node number based quorum, which allows to avoid potential anomalies of location quorum for cases where nodes are distributed over multiple sites in a very unbalanced way, making sure that regardless how the nodes of a subcluster are distributed across locations, subcluster with a size beyond a certain threshold size always get quorum and that subcluster with a size below a certain threshold size never get quorum. Therefore the computable quorum decisions provide guarantees on the minimal redundancy levels of the subcluster that may continue its service. The computable quorum decisions are preferable over a pure tiebreaker function since they are fast and reliable compared to tiebreak decisions which are slow and not reliable and require communication with external "witness". So pure tiebreaker functions may not come to a result if the external witness is not reachable and require therefore a timeout handling.

The above, as well as additional purposes, features, and advantages of the present invention will become apparent in the following detailed written description.

BRIEF DESCRIPTION OF THE DRAWINGS

A preferred embodiment of the present invention, as described in detail below, is shown in the drawings, in which.

DETAILED DESCRIPTION

Figure 1:
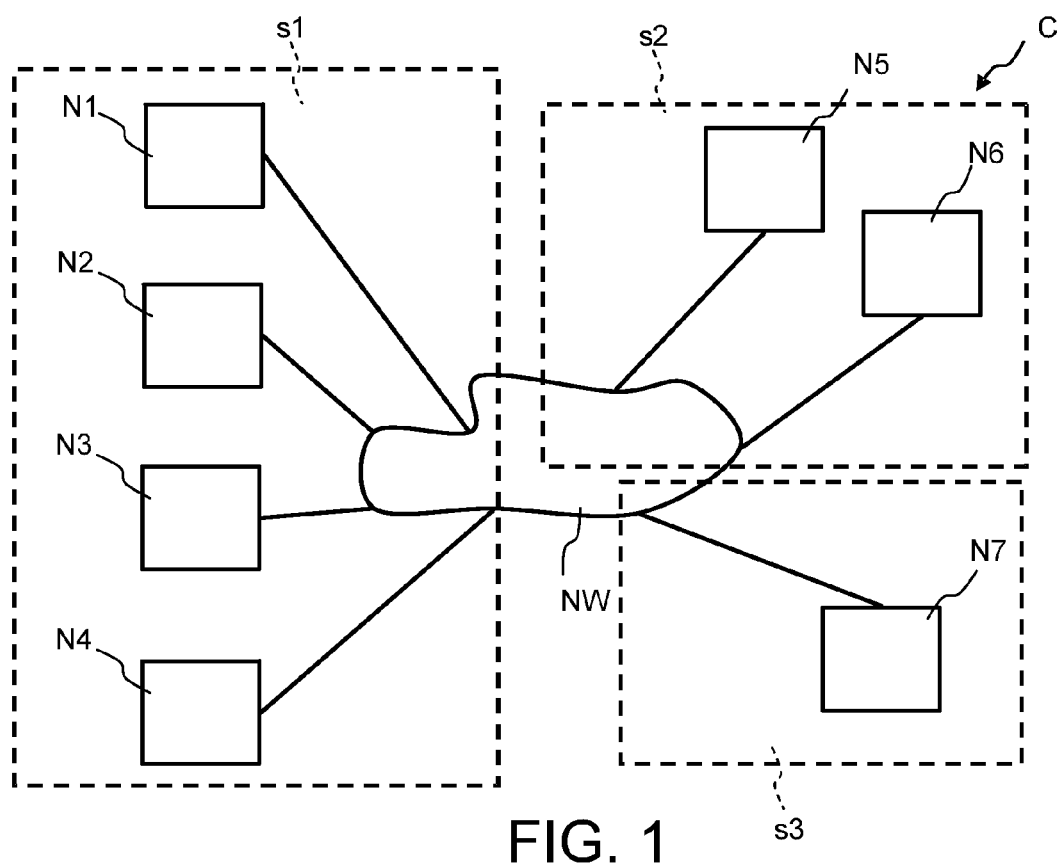
FIG. 1 is a schematic block diagram of a cluster with defined nodes in three locations connected by a network, in accordance with an embodiment of the present invention.
Figure 2:
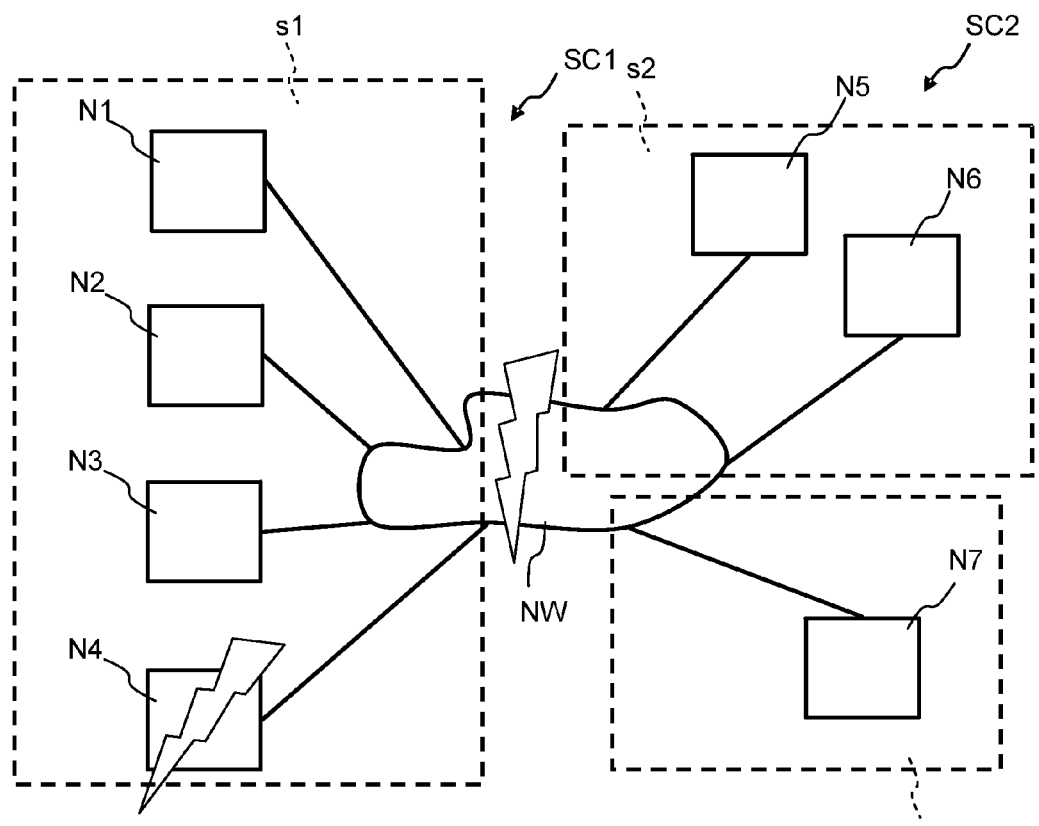
FIG. 2 is a schematic block diagram of the cluster shown in FIG. 1 while failures occurred.
Figure 3:
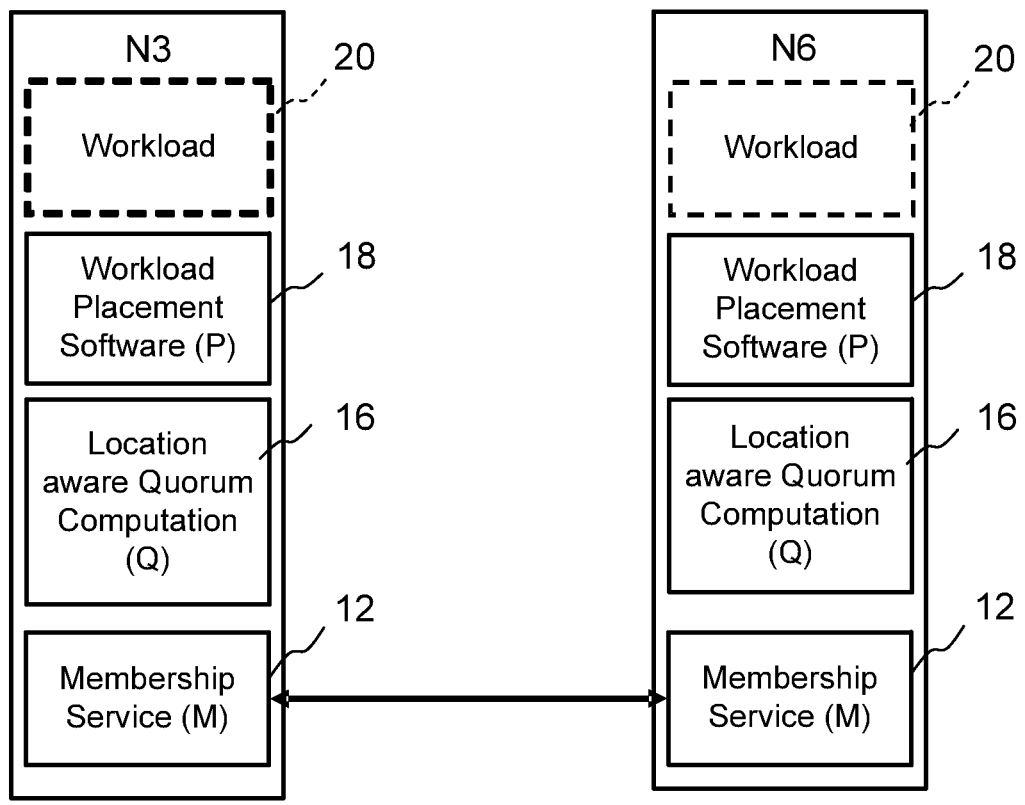
FIG. 3 is a schematic block diagram of two connected nodes, in accordance with an embodiment of the present invention.
Figure 4:
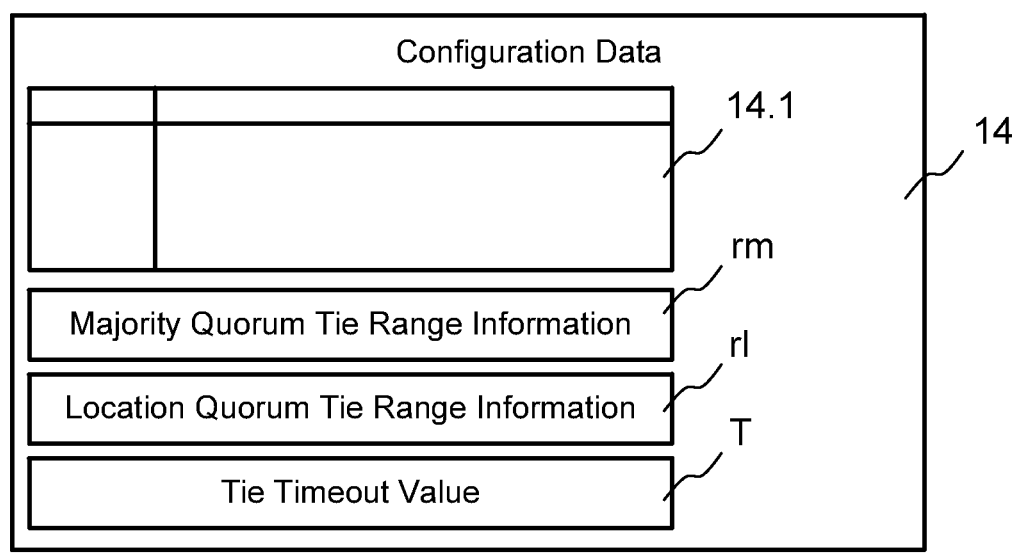
FIG. 4 is a schematic block diagram of configuration data, in accordance with an embodiment of the present invention.

FIG. 1 is a schematic block diagram of a computer cluster C with defined nodes N1, N2, N3, N4, N5, N6, N7 in three locations s1, s2, s3 connected by a network NW; and FIG. 2 is a schematic block diagram of the computer cluster C shown in FIG. 1 while failures occurred. FIG. 3 is a schematic block diagram showing exemplary for all nodes N1 to N7 two connected nodes N3 and N6; and FIG. 4 is a schematic block diagram of configuration data used in a location aware quorum computation service (Q) 16 shown in FIG. 3.

Referring to FIGS. 1 and 2, the shown embodiment of the cluster C is distributed over multiple locations or sites s1, s2, s3 and comprises a plurality of interconnected defined system instances or nodes N1, N2, N3, N4, N5, N6, N7 running on a physical or virtual hardware. In the shown embodiment nodes N1 through N4 are located in site s1, nodes N5 and N6 are located in site s2 and node N7 is located in site s3.

FIG. 2 shows the cluster C of FIG. 1 with two failures, wherein Node 4 failed and the network NW no longer allows communication between nodes on site s1 on the one hand and sites s2 and s3 on the other hand. Thus healthy nodes N1 to N3 form one subcluster SC1 and healthy nodes N5 to N7 form another subcluster SC2.

Referring to FIG. 3 each of the exemplary shown nodes N3 and N6 comprises a membership service 12 to communicate with other nodes, a location aware quorum computation service 16 for granting or denying quorum to a corresponding node, and a workload placement software service 18 for activating a workload 20, drawn with dashed lines.

The membership service (M) of node N1 to N7 communicates with the membership services (M) of other nodes to detect which other nodes are healthy and reachable. In the shown embodiment of FIG. 3 the membership services (M) of nodes N1, N2, N3 of the first subcluster SC1 are able to communicate with each other, and the membership services (M) of nodes N5, N6, N7 of the second subcluster SC2 are able to communicate with each other. Further the location aware quorum computation service Q of each node N1 to N7 grants or denies quorum to that node N1 to N7 with every change in the subcluster SC1, SC2 the node N1 to N7 belongs to, detected by the membership service M. The workload placement software service P of each node N1 to N7 is part of a distributed cluster manager and decides under consideration of the quorum status provided by the location aware quorum computation service Q whether a workload W may be started, kept running or stopped on that node N1 to N7.

FIG. 4 shows the configuration data CC of the cluster C that must be available to each node N1 to N7 of the cluster C according to this invention. The configuration data CC comprises a table 14.1 that contains all defined nodes N1 to N7 of the cluster C together with information on the location each node N1 to N7 is located in, a majority based quorum tie range information rm, a location quorum tie range information rl and a tie time out value T.

Referring to FIGS. 1 to 4 an arrangement for operating a computer cluster C distributed over multiple locations s1, s2, s3 according to embodiments of the present invention uses a quorum mechanism. As mentioned above the shown cluster C comprises a plurality of interconnected defined system instances N1 to N7 running on a physical or virtual hardware, wherein each system instance N1 to N7 in the cluster C runs the distributed cluster manager P. The cluster configuration CC comprises location information about each system instance N1 to N7 defined in the cluster C and is distributed to each defined system instance N1 to N7. The membership service component M of each system instance N1 to N7 constantly checks connectivity among the system instances N1 to N7 defined in the cluster C to determine reachable system instances N1 to N3; and N5 to N7.

Further the membership service M in each healthy system instance N1 to N3; N5 to N7 determines a subcluster SC1, SC2 comprising the corresponding healthy system instance N1 to N3; N5 to N7 and all reachable system instances the healthy system instance N1 to N3; N5 to N7 is connected to, using information of the distributed cluster configuration CC.

The membership service M in each healthy system instance N1 to N3; N5 to N7 calculates corresponding subcluster configuration SCC(SCx) comprising location information about each system instance N1 to N3; N5 to N7 of the subcluster SC1, SC2. The location aware quorum computation service Q in the healthy system instance N1 to N3; N5 to N7 uses the subcluster configuration SCC(SCx) information and the cluster configuration CC information for computing a new quorum decision for the corresponding subcluster SC1, SC2 the healthy system instance N1 to N3; N5 to N7 is member of, using a location quorum function (LQF) considering proportions of connected locations s1, s2, s3 containing reachable system instances N1 to N3; N5 to N7, and weights of the reachable system instances N1 to N3; N5 and N6; N7 in the locations s1, s2, s3. The workload placement component P in the healthy system instance N1 to N3; N5 to N7 makes workload placement decisions based on the computed new quorum granting permission to place workload to system instances N1 to N3; N5 to N7 in a specific subcluster SC1, SC2, or refusing the permission, whenever the subcluster SC1, SC2 changes.

In embodiments of the present invention the location aware quorum computation service Q uses a majority based quorum function (MQF) considering a total number of connected healthy system instances SCN(SCx) for subcluster SC1, SC2 and a total number of defined system instances CN in the cluster C in combination to the location quorum function (LQF) to calculate the new quorum for the corresponding subcluster SC1, SC2. Therefore the distributed cluster configuration CC comprises at least one of the following a total number of defined system instances CN in the cluster C, a total number of locations SN in the cluster C, a total number of defined system instances in a corresponding location CN(s), identification information of each system instance N1 to N7, a first tie range information rm of a majority based quorum function (MQF), a second tie range information rl of the location quorum function (LQM), and at least one tie time out value T.

A first tie range of the majority based quorum function (MQF) is defined by the first tie range information (rm) which is configurable as (0≤rm≤0.5) such that the first tie range extends from (0.5−rm) to (0.5+rm). A second tie range of the location quorum function (LQF) is defined by the second tie range information (rl) which is configurable as (0≤rl≤0.5) such that the second tie range extends from (0.5−rl) to (0.5+rl). The values rm, rl and T are meant to be configurable values and allow the cluster administrator to describe the minimal size of a subcluster SC1, SC2 that may run a workload, wherein T limits the time period that may be spend computing the quorum.

In alternative embodiments of the present invention the total number of defined system instances CN in the cluster C, the total number of locations SN in the cluster C and the total number of defined system instances in a corresponding location CN(sx) may be calculated by using the location information and the identification information of each defined system instance N1 to N7 of the cluster.

At the start of the cluster C and whenever a node N4 becomes unreachable or whenever an unreachable node N4 rejoins the cluster C each healthy node N1 to N3, N5 to N7 computes the subcluster configuration SCC(SCx) of the subcluster SC1, SC2 it belongs to. Referring to FIG. 2, each node N1 to N3 of the first subcluster SC1 computes the subcluster configuration SCC(SC1) of the first subcluster SC1, and each node N5 to N7 of the second subcluster SC2 computes the subcluster configuration SCC(SC2) of the second subcluster SC2. The subcluster configuration SCC(SCx) contains the node id of each healthy node N1 to N3; N5 to N7 that is reachable from any healthy node N1 to N3; N5 to N7 in that subcluster SC1, SC2. Based on the information in the cluster configuration CC and the subcluster configuration SCC(SCx) each node determines whether its subcluster is granted quorum or whether it is in a tie situation or whether it is denied quorum using the configurable majority based quorum function (MQF).

Let CN be the total number of nodes in the cluster C, and SCN(SCx) be the total number of reachable healthy nodes in a corresponding subcluster SC1, SC2 then the majority based quorum function (MQF) calculates a subcluster ratio (R(SCx)) for each subcluster according to equation (1).

$$R(SCx)=SCN(SCx)/CN \qquad (1)$$

The majority based quorum function (MQF) grants quorum to a subcluster SC1, SC2 if inequation (2) is true.

$$R(SCx)>(0.5+rm) \qquad (2)$$

The majority based quorum function (MQF) refused quorum to a subcluster SC1, SC2 if inequation (3) is true.

$$R(SCx)<(0.5-rm) \qquad (3)$$

Otherwise the majority based quorum function (MQF) is in a tie situation. That means that the tie range of the majority based quorum function (MQF) is defined by (4).

$$(0.5-rm) \le R(SCx) \le (0.5+rm) \qquad (4)$$

For explanation purposes let rm be 0.1, for example. For the embodiment shown in FIG. 2, the total number of nodes CN in the cluster C is 7, the total number of reachable healthy nodes in the first subcluster SC1 is 3, and the total number of reachable healthy nodes in the second subcluster SC2 is also 3. Therefore the subcluster ratio (R(SCx)) according to equation (1) is calculated as 3/7 for both subclusters SC1, SC2. Inequation (2) is solved as (3/7)>0.6, which is not true for both subclusters SC1, SC2. Inequation (3) is solved as (3/7) <0.4, which is also not true for both subclusters SC1, SC2. So the majority based quorum function (MQF) is in a tie situation for the embodiment shown in FIG. 2.

If the majority based quorum function (MQF) is in a tie situation it tries to resolve the tie situation using the location quorum function (LQF). If that tie situation cannot be resolved within the timeout T the quorum is denied.

In a possible embodiment of the location quorum function (LQF) SN is the total number of locations in the cluster C. For any location sx let CN(sx) be the total number of defined nodes in location sx, and let SCN(SCx,sx) be the total number of healthy nodes of a subcluster SCx that are located in location sx. The location quorum function (LQF) calculates a first location ratio (W(sx,SCx)) for each location s1; s2, s3 of a corresponding subcluster SC1, SC2 according to equation (5).

$$W(sx,SCx)=(SCN(SCx,sx))/(CN(sx)) \qquad (5)$$

Further the location quorum function (LQF) calculates a sum W(SCx) of all first location ratios (W(sx,SCx)) for all locations s1; s2, s3 of the corresponding subcluster SC1, SC2 according to equation (6).

$$W(SCx)=\Sigma W(sx,SCx) \qquad (6)$$

The location quorum function (LQF) grants quorum to a subcluster SC1, SC2 if inequation (7) is true.

$$(W(SCx))/(SN)>(0.5+rl) \qquad (7)$$

The location quorum function (LQF) refused quorum to a subcluster SC1, SC2 if inequation (8) is true.

$$(W(SCx))/(SN)<(0.5-rl) \quad (8)$$

Otherwise the location quorum function (LQF) is in a tie situation. That means that the tie range of the location quorum function (LQF) is defined by (9).

$$(0.5-rl) \leq (W(SCx))/(SN) \leq (0.5+rl) \quad (9)$$

The tie situation may be resolved using a tiebreaker function according to prior art. If the tie situation cannot be resolved before the tie time out T expires the subcluster will be refused quorum.

For explanation purposes let rl be 0.1, for example. For the embodiment shown in FIG. 2, the total number of locations in the cluster C is 3, the total number of defined nodes CN(s1) in location s1 is 4, and the total number of healthy nodes SCN (SC1,s1) of the first subcluster SC1 that are located in location s1 is 3, the total number of defined nodes CN(s2) in location s2 is 2, and the total number of healthy nodes SCN (SC2,s2) of the second subcluster SC2 that are located in location s2 is 2, the total number of defined nodes CN(s3) in location s3 is 1, and the total number of healthy nodes SCN (SC2,s3) of the second subcluster SC1 that are located in location s3 is 1. Therefore the first location ratio (W(s1,SC1)) for location s1 of the corresponding first subcluster SC1 is calculated as 3/4, the first location ratio (W(s2,SC2)) for location s2 of the corresponding second subcluster SC2 is calculated as 2/2, and the first location ratio (W(s3,SC2)) for location s3 of the corresponding second subcluster SC2 is calculated as 1/1.

The sum W(SC1) of all first location ratios (W(s1,SC1)) for all locations s1 of the corresponding first subcluster SC1 is calculated as 3/4. The sum W(SC2) of all first location ratios (W(s2,SC2)), (W(s3,SC2)) for all locations s2, s3 of the corresponding second subcluster SC2 is calculated as 2. Inequation (7) is solved for the first subcluster SC1 as (1/4) >0.6, which is not true. Inequation (8) is solved as (1/4)<0.4, which is true for the first subcluster SC1. So the location quorum function (LQF) refuses quorum to the first subcluster SC1. Inequation (7) is solved for the second subcluster SC2 as (2/3)>0.6, which is true for the second subcluster SC2. So the location quorum function (LQF) grants quorum to the second subcluster SC2, for the embodiment shown in FIG. 2.

In an alternative embodiment of the location quorum function (LQF) each location s1, s2, s3 has a location specific tiebreaker accessible to all nodes N1 to N4; N5, N6; N7 located in that corresponding location s1, s2, s3. Let SN be the total number of locations in the cluster C. For any location sx let CN(sx) be the total number of defined nodes in location sx and SCN(SCx,sx) be the total number of nodes in the corresponding subcluster SC1, SC2 that are located in location sx. The location quorum function (LQF) calculates the first location ratio (W(sx,SCx)) for each location s1; s2, s3 of a corresponding subcluster SC1, SC2 according to equation (5). Further the location quorum function (LQF) calculates a second location ratio (w(sx,SCx)) for each location s1; s2, s3 of a corresponding subcluster SC1, SC2 based on the first location ratio (W(sx,SCx)).

The second location ratio (w(sx,SCx))=1 if the first location ratio (W(sx,SCx))>0.5, or if the first location ratio (W(sx, SCx))=0.5, and a corresponding subcluster SC1, SC2 has won a tiebreaker specific to the location s1, s2, s3, else the second location ratio (w(sx,SCx))=0.

Further the location quorum function (LQF) calculates a sum w(SCx) of all second location ratios (w(sx,SCx)) for all locations s1; s2, s3 of the corresponding subcluster SC1, SC2 according to equation (10).

$$w(SCx) = \Sigma w(sx,SCx) \quad (10)$$

The location quorum function (LQF) grants quorum to a subcluster SC1, SC2 if inequation (11) is true.

$$(w(SCx))/(SN)>(0.5+rl) \quad (11)$$

The location quorum function (LQF) refused quorum to a subcluster SC1, SC2 if inequation (12) is true.

$$(w(SCx))/(SN)<(0.5-rl) \quad (12)$$

Otherwise the location quorum function (LQF) is in a tie situation. That means that the tie range of the location quorum function (LQF) is defined by (13).

$$(0.5-rl) \leq (w(SCx))/(SN) \leq (0.5+rl) \quad (13)$$

The tie situation may be resolved using a tiebreaker function according to prior art. If the tie situation cannot be resolved before the tie time out T expires the subcluster will be refused quorum.

If a computer cluster C has some nodes located in location sx and location sx contains sn nodes where sn>CN/2 then the majority quorum tie range information rm may be set according to inequation (14).

$$mr \geq 0.5 - ((CN-sn)/CN) \quad (14)$$

This will avoid that a failure of location sx will necessarily result in no quorum being granted to any subcluster.

Figure 5:
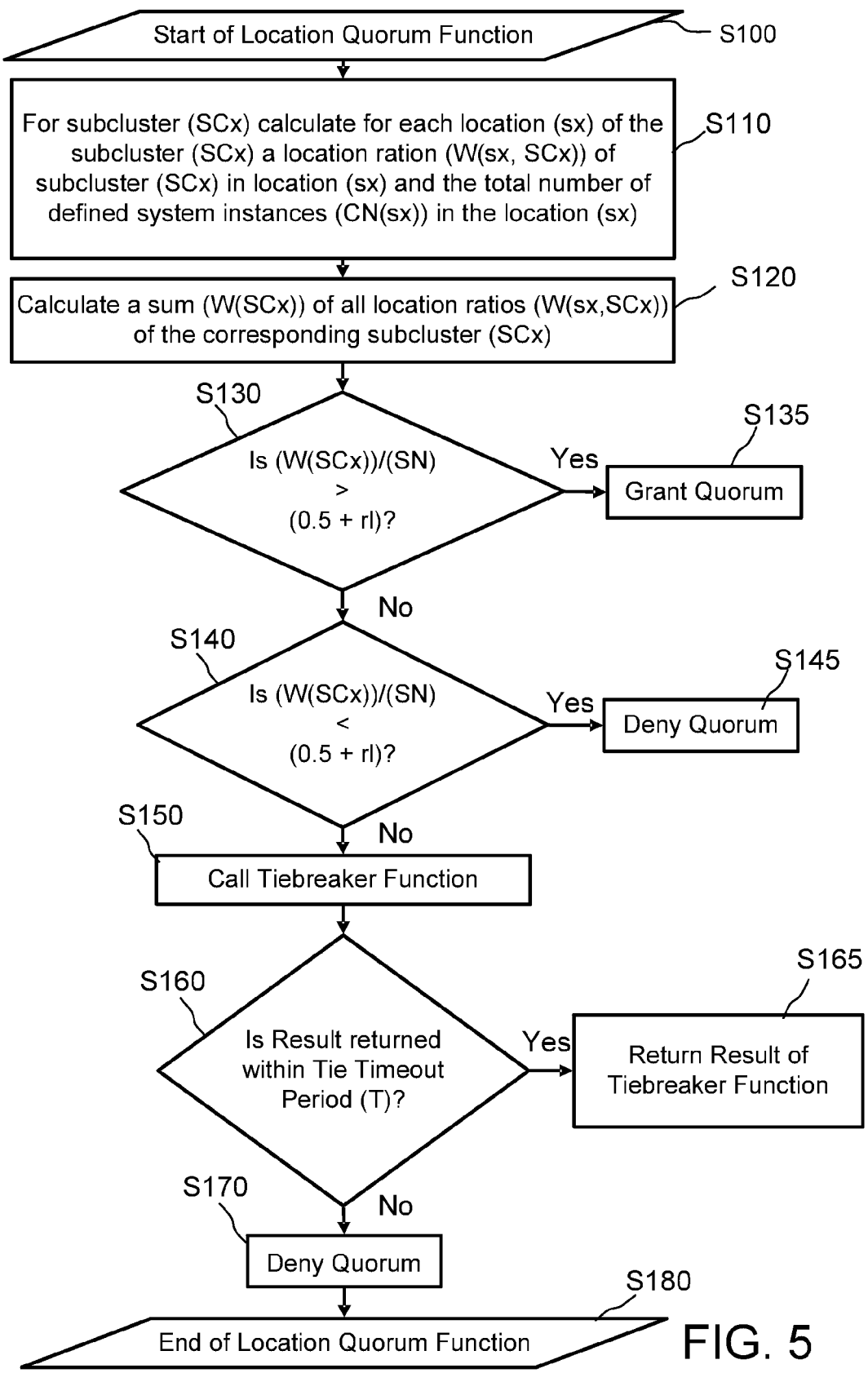
FIG. 5 is a schematic flow diagram of a location quorum function used by a method for operating a computer cluster distributed over multiple locations, in accordance with an embodiment of the present invention.
Figure 6:
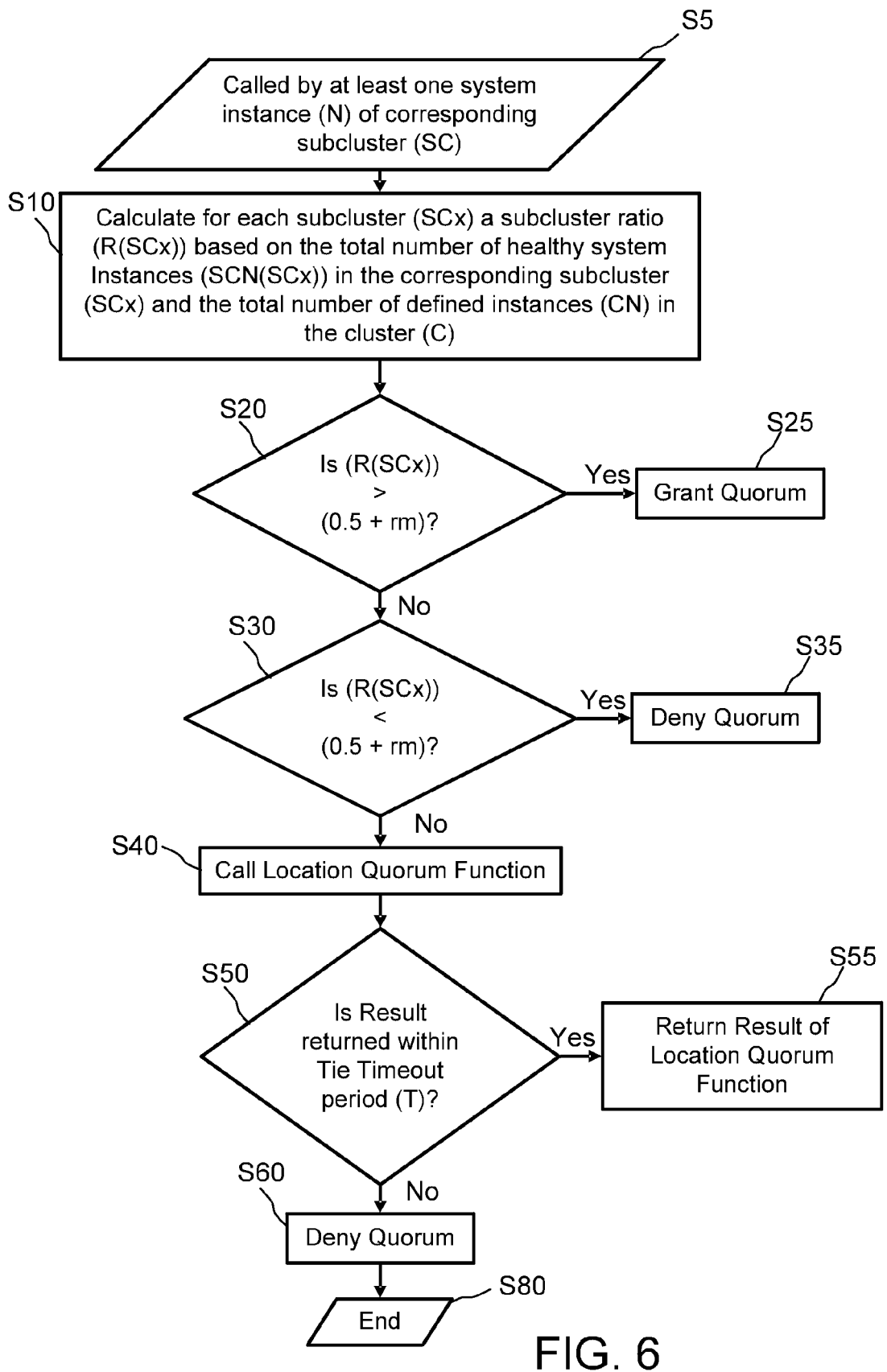
FIG. 6 is a schematic flow diagram of a configurable majority based quorum function using the location quorum function shown in FIG. 5 used by a method for operating a computer cluster distributed over multiple locations, in accordance with an embodiment of the present invention.

FIG. 5 is a schematic flow diagram of a location quorum function (LQF) used by a method for operating a computer cluster C distributed over multiple locations s1, s2, s3, in accordance with an embodiment of the present invention; and FIG. 6 is a schematic flow diagram of a configurable majority based quorum function (MQF) using the location quorum function (LQF) shown in FIG. 5 used by a method for operating a computer cluster C distributed over multiple locations s1, s2, s3, in accordance with an embodiment of the present invention.

Referring to FIG. 5 the location quorum function (LQF) is started in step S100. In step S110 for each location s1; s2, s3 of a corresponding subcluster SC1, SC2 the above explained location ratio (W(sx,SCx)) is calculated based on the total number of healthy systems instances (SCN(SCx,sx)), and the total number of defined system instances (CN(sx)) of the subcluster SC1, SC2 in the corresponding location s1; s2, s3. In step S120 the above explained sum (W(SCx)) of all location ratios (W(sx,SCx)) of the corresponding subcluster SC1, SC2 is calculated. In query S130 it is proven if the ratio of the sum (W(SCx)) of all location ratios (W(sx,SCx)) of the corresponding subcluster SC1, SC2 and the total number of locations in the defined cluster SN is larger than a configurable first threshold (0.5+rl).

If this is true, quorum is granted to the corresponding subcluster SC1, SC2 in step S135. If this is not true, it is proven in query S140 if the ratio of the sum (W(SCx)) of all location ratios (W(sx,SCx)) of the corresponding subcluster SC1, SC2 and the total number of locations in the defined cluster SN is smaller than a configurable second threshold (0.5-rl). If this is true, quorum is denied to the corresponding subcluster SC1, SC2 in step S145. If this is not true, a tiebreaker function is called in step S150. In query S160 it is proven if a result of the tiebreaker function is returned within the tie timeout period T. If this is true, the result of the tiebreaker function is returned to the calling instance of the location quorum function. If this is not true, the quorum is denied to the corresponding subcluster SC1, SC2 in step S170 and the location quorum function (LQF) is finished in step S180. The calling instance could be a method for operating a computer cluster C distributed over multiple locations s1, s2, s3 or a majority based quorum function (MQF), for example.

Referring to FIG. 6 the majority based quorum function (MQF) is started in step S5 called by at least one system instance N1 to N3; N5 to N7 of a corresponding subcluster SC1, SC2. In step S10 for each subcluster SC1, SC2 the above explained subcluster ratio (R(SCx)=SCN(SCx)/CN) is calculated based on the total number of healthy systems instances (SCN(SCx)) in the corresponding subcluster SC1, SC2, and the total number of defined system instances (CN) in the cluster C. In query S20 it is proven if the subcluster ratio (R(SCx)) is larger than a configurable third threshold (0.5+rm). If this is true, quorum is granted to the corresponding subcluster SC1, SC2 in step S25.

If this is not true, it is proven in query S30 if the subcluster ratio (R(SCx)) is smaller than a configurable fourth threshold (0.5−rm). If this is true, quorum is denied to the corresponding subcluster SC1, SC2 in step S35. If this is not true, the above described location quorum function (LQF) is called in step S40. In query S50 it is proven if a result of the location quorum function (LQF) is returned within the tie timeout period T. If this is true, the result of the location quorum function (LQF) is returned to the calling instance of the majority based quorum function (MQF). If this is not true, the quorum is denied to the corresponding subcluster SC1, SC2 in step S60 and the majority based quorum function (MQF) is finished in step S80. The calling instance could be a method for operating a computer cluster C distributed over multiple locations s1, s2, s3, for example.

The inventive method for operating a computer cluster distributed over multiple locations can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. An apparatus for operating a computer cluster distributed over multiple locations using quorum mechanism, wherein said cluster (C) comprises a plurality of interconnected defined system instances running on a physical or virtual hardware, wherein each system instance in said cluster (C) runs a distributed cluster manager (P), wherein a cluster configuration (CC) comprises location information about each system instance defined in said cluster (C) and is distributed to each defined system instance, the apparatus comprising one or more of hardware and software, the software stored on one or more non-transitory computer readable media, the apparatus comprising:

a membership service (M) that constantly checks connectivity among said system instances defined in said cluster (C) to determine reachable system instances, wherein said membership service (M) in each healthy system instance determines a subcluster (SCx) comprising said corresponding healthy system instance and all reachable system instances said healthy system instance is connected to, using information of said distributed cluster configuration (CC), and that calculates corresponding subcluster configuration (SCC(SCx)) comprising location information about each system instance of said subcluster (SCx);

a location aware quorum computation service (Q) in said healthy system instance that uses said subcluster configuration (SCC(SCx)) information and said cluster configuration (CC) information for computing a new quorum decision for said corresponding subcluster (SCx) said healthy system instance is member of, using a location quorum function (LQF) considering proportions of connected locations containing reachable system instances, and weights of said reachable system instances in said locations; and a workload placement software service (P) in said healthy system instance that makes workload placement decisions based on a computed new quorum granting permission to place workload to system instances in a specific subcluster (SCx), or refusing said permission, whenever said subcluster (SCx) changes.

2. The apparatus according to claim 1, wherein said location aware quorum computation service (Q) uses a majority based quorum function (MQF) considering a total number of connected healthy system instances (SCN(SCx)) and a total number of defined system instances (CN) in said cluster (C) in combination to said location quorum function (LQF) to calculate said new computed quorum for said corresponding subcluster (SCx).

3. The apparatus according to claim 2, wherein said location aware quorum computation service (Q) uses said location quorum function (LQF) to solve a tie situation of said majority based quorum function (MQF), and a tiebreaker function (TBF) to solve a tie situation of said location quorum function (LQF).

4. The apparatus according to claim 3, wherein at least one of said location quorum function (LQF) and said majority based quorum function (MQF) comprise a configurable range of quorum tie situations.

5. The apparatus according to claim 2, wherein said distributed cluster configuration (CC) comprises at least one of the following: said total number of defined system instances in said cluster (CN), said total number of locations (SN) in said cluster (C), a total number of defined system instances in a corresponding location (CN(s)), identification information of each system instance, a first tie range information (rm) of said majority based quorum function (MQF), a second tie range information (rl) of said location quorum function (LQF), and at least one tie time out value (T)), wherein a first tie range of said majority based quorum function (MQF) is defined by said first tie range information (rm) which is configurable as (0≤rm≤0.5) such that said first tie range extends from (0.5−rm) to (0.5+rm), and wherein a second tie range of said location quorum function (LQF) is defined by said second tie range information (rl) which is configurable as (0≤rl≤0.5) such that said second tie range extends from (0.5−rl) to (0.5+rl).

6. The apparatus according to claim 2, wherein said majority based quorum function (MQF) calculates for each subcluster (SCx) a subcluster ratio (R(SCx)) based on a total number of healthy system instances (SCN(SCx)) in a corresponding subcluster (SCx) and said total number of defined system instances (CN) in said cluster (C), wherein said majority based quorum function (MQF) grants quorum to a corresponding subcluster (SCx) if said subcluster ratio (R(SCx)) is larger than a configurable third threshold (0.5+rm), and denies quorum, if said subcluster ratio (R(SCx)) is smaller than a configurable fourth threshold (0.5−m), else said majority based quorum function (MQF) solves an occurring tie situation using said location quorum function (LQF), wherein said majority based quorum function (MQF) denies quorum, if said tie situation is not solved within a configurable timeout period (T).

7. The apparatus according to claim 1, wherein said location quorum function (LQF) calculates for each location of said at least one subcluster (SCx) a first location ratio (W(sx, SCx)) based on a total number of healthy system instances (SCN(SCx,sx)) in said corresponding subcluster (SCx), and a total number of defined system instances (CN(sx)) in said corresponding location.

8. The apparatus according to claim 7, wherein said location quorum function (LQF) calculates a sum (W(SCx)) of all first location ratios (W(sx,SCx)) of said at least one subcluster (SCx), wherein said location quorum function (LQF) grants quorum to a corresponding subcluster (SC2) if a ratio based on said calculated sum (W(SC2)) and a total number of locations (SN) defined in said cluster (C) is larger than a configurable first threshold (0.5+rl), and denies quorum, if said ratio based on said calculated sum (W(SC2)) and said total number of locations (SN) defined in said cluster (C) is smaller than a configurable second threshold (0.5−rl), else said location quorum function (LQF) solves an occurring tie situation using a tiebreaker function (TBF), wherein said location quorum function (LQF) denies quorum, if said tie situation is not solved within a configurable timeout period (T).

9. The apparatus according to claim 7, wherein said location quorum function (LQM) calculates for each location of said at least one subcluster (SCx) a second location ratio (w(sx,SCx)) based on said first location ratio (W(sx,SCx)), wherein said second location ratio (w(sx,SCx)) outputs a value of "1", if a value of said first location ratio (W(sx,SCx)) is larger than a value of (0.5), or if said first location ratio (W(sx,SCN)) is equal to said value of (0.5) and a corresponding subcluster (SCx) has won a tiebreaker specific to said location, else said second location ratio (W(sx,SCx)) outputs a value of "0", wherein said location quorum function (LQF) calculates a sum (w(SCx)) of all second location ratios (w(sx, SCx)) of said at least one subcluster (SCx), wherein said location quorum function (LQF) grants quorum to a corresponding subcluster (SC2) if a ratio based on said calculated sum (w(SC2)) and a total number of locations (SN) defined in said cluster (C) is larger than said configurable first threshold (0.5+rl), and denies quorum, if said ratio based on said calculated sum (w(SC2)) and said total number of locations (SN) defined in said cluster (C) is smaller than a configurable second threshold (0.5−rl), else said location quorum function (LQF) solves an occurring tie situation using a tiebreaker function (TBF), wherein said location quorum function (LQF) denies quorum, if said tie situation is not solved within a configurable timeout period (T).

* * * * *